C. H. MERRITT.
RAILWAY CATTLE GUARD.
APPLICATION FILED NOV. 23, 1917.
1,254,922.
Patented Jan. 29, 1918.
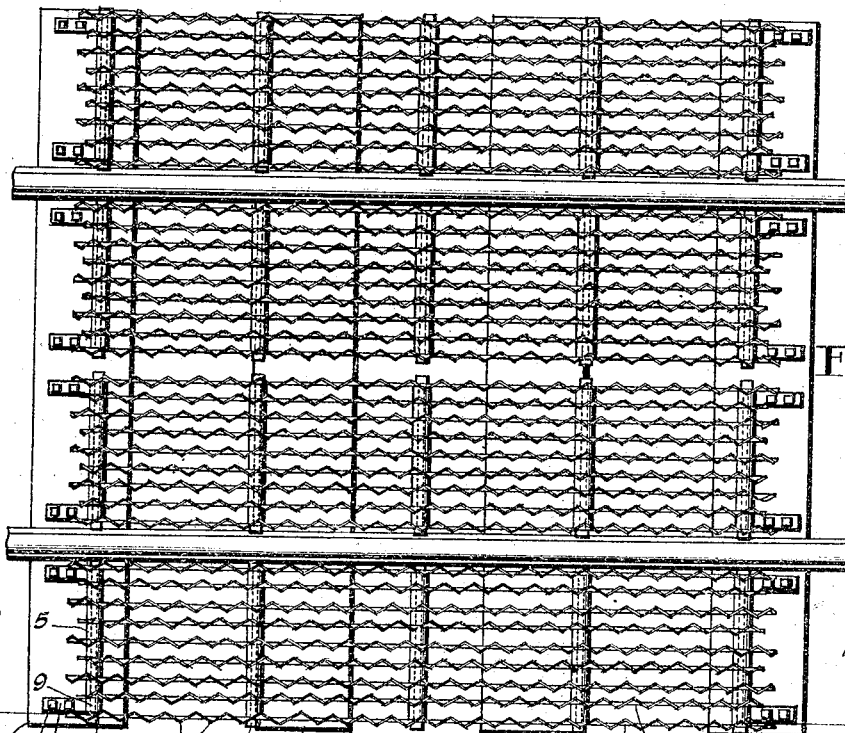
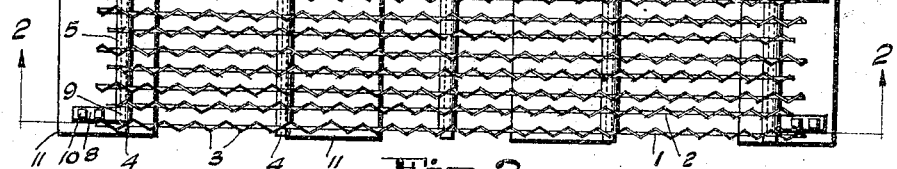
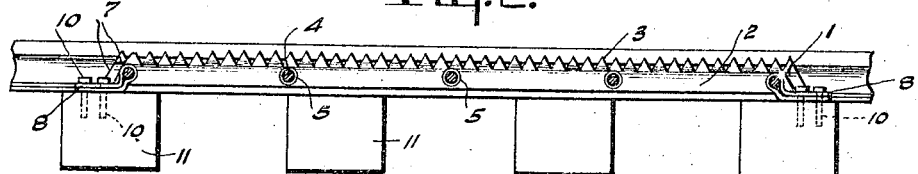
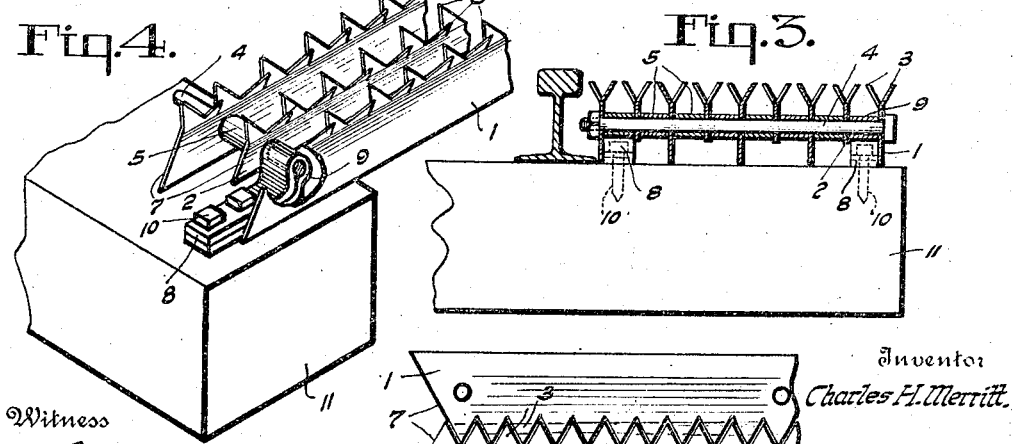
Inventor
Charles H. Merritt

UNITED STATES PATENT OFFICE.

CHARLES HENRY MERRITT, OF BIRMINGHAM, ALABAMA.

RAILWAY CATTLE-GUARD.

1,254,922.   Specification of Letters Patent.   Patented Jan. 29, 1918.

Application filed November 23, 1917. Serial No. 203,572.

*To all whom it may concern:*

Be it known that I, CHARLES H. MERRITT, a citizen of the United States of America, residing at Birmingham, in the county of Jefferson and State of Alabama, have invented certain new and useful Improvements in Railway Cattle-Guards, of which the following is a specification.

This invention relates to a railway cattle guard and covers improvements upon the type of cattle guard described in Letters Patent to Smith Abernathy, No. 635,413, in which is shown a series of parallel metallic bars having their upper edges saw toothed with the teeth alternately inclined in opposite directions throughout the length of the bar.

One object of my present invention is to obtain a simple and effective means for spacing and connecting the bars so as to give the cattle guard the necessary rigidity and at the same time prevent the tendency of the bars to be bent or warped laterally when stepped upon or when heavy articles fall thereon, thus impairing the usefulness of the guard. To this end I connect the bars below their toothed edges by closely spaced transverse bolts having spacer sleeves thereon to space the bars. By this arrangement the cattle guard can be cheaply and quickly assembled and will possess the requisite rigidity and will be braced at sufficiently short intervals throughout its length to hold the bars rigidly in position.

A further object of my invention is to simplify the manner of attachment of the cattle guard to the cross ties of the railroad and to this end I provide, at each end of each cattle guard section, one or more straps which preferably serve in lieu of spacers where they are applied to the end connecting bolts, and which are perforated to receive spikes which when driven in the cross ties will hold the guard in position.

A further object is to improve the design of the bars so as to prevent any hanging or dragging part of a train catching on the ends of the guard and for this purpose the ends of the bars are cut on a slope from the top of the end saw tooth to the bottom edge of the plate.

A further object is to reduce to a minimum the amount of metal in the bars required for producing the cattle guard and to this end I propose to utilize bars of varying widths, alternately using the wider bars to support, by means of the cross bolts, the interposed narrower bars. By this arrangement and without sacrificing the proper strength for the cattle guard I am enabled to materially reduce its weight and cost.

These and other objects of my invention will be better understood by reference to the accompanying drawings, in which I illustrate the preferred embodiments of my invention only.

In the drawings:—

Figure 1 illustrates in plan view a track equipped with my improved cattle guard.

Fig. 2 is a cross section on the line 2—2 of Fig. 1.

Fig. 3 is an enlarged cross sectional view.

Fig. 4 is a detail perspective view of an end of one of the cattle guard sections.

Fig. 5 is a plan view showing the relative difference in size of the two types of bars employed.

Similar reference numerals refer to similar parts throughout the drawings.

I preferably manufacture the cattle guard in four similar sections which together form a cattle guard unit, two sections to be arranged between the rails and one on each side of the track. Each cattle guard section is composed of longitudinal bars or plates 1 and 2 arranged alternately and in parallelism and disposed on edge with their upper edges provided with substantially triangular shaped projections or teeth 3, each tooth being inclined at an angle to a vertical plane reverse to the angle of the next adjacent teeth. The bars are so spaced and the teeth so arranged relatively that they are staggered, this arrangement causing the teeth to practically cover the entire area of the cattle guard section so as to prevent an animal from placing his foot anywhere that will avoid the sharp teeth. The bars 1 and 2 are similar with the exception that the bars 1 are wider from top to bottom than the bars 2.

The bars of each section are cross connected at relatively short intervals by transverse bolts 4 having sleeves or pipe sections 5 mounted thereon between each pair of bars to space the latter and enable the cattle guard, as a whole, to be rigidly held together by the nuts used on the bolts. The two end edges 7 of the bars are preferably caused to slope from the tip of the end tooth downwardly and outwardly to the base of the bar.

I provide securing straps or fasteners 8, each formed of a bent metal strap which is shaped to provide an eye 9 that is slipped on an end bolt and takes the place of one of the spacer sleeves. The ends of the straps are perforated to receive spikes 10 which, when driven therethrough into the cross tie 11, will securely hold the guard against endwise displacement.

I arrange two of the cattle guard sections between the rails 11 and one on the outside of each rail. The cross connecting and bracing bolts are spaced on centers sufficiently close to brace the guard against the lateral bending or displacement of its bars. The strength of the alternate plates 1 is ample to support any load that may come on the cattle guard as a whole.

Having thus described my invention, what I claim as new and desire to secure by Letters Patent, is:—

A railway cattle guard comprising longitudinal bars provided along their upper edges with laterally inclined teeth, a plurality of cross connecting bolts passed through the bars, spacers surrounding the bolts between the bars, the alternate bars terminating immediately below the bolt and the intermediate bars being elongated downwardly to support the weight of the whole cattle guard.

In testimony whereof I affix my signature.

CHARLES HENRY MERRITT.

Witness:
NOMIE WELSH.

Copies of this patent may be obtained for five cents each, by addressing the "Commissioner of Patents, Washington, D. C."